United States Patent [19]

Vaughan et al.

[11] Patent Number: 5,206,005

[45] Date of Patent: Apr. 27, 1993

[54] SYNTHESIS OF ECR-1 USING METHYLTRIETHANOLAMMONIUM CATIONS

[75] Inventors: David E. W. Vaughan, Flemington; Karl G. Strohmaier, Port Murray, both of N.J.

[73] Assignee: Exxon Research & Engineering Company, Florham Park, N.J.

[21] Appl. No.: 932,435

[22] Filed: Aug. 19, 1992

[51] Int. Cl.$^5$ .............................................. C01B 33/34
[52] U.S. Cl. .................................... 423/707; 423/709

[58] Field of Search ............... 423/326, 328, 329, 330, 423/707, 709; 502/77

[56] References Cited

U.S. PATENT DOCUMENTS 4,657,748 4/1987 Vaughan et al. .................... 423/328

Primary Examiner—R. Bruce Breneman
Attorney, Agent, or Firm—Ronald D. Hantman

[57] ABSTRACT

The present invention is a method to make ECR-1 with a methylmethanol ammonium cation template. This new synthesis produces an improved product at lower cost, with improved catalytic properties.

7 Claims, No Drawings

SYNTHESIS OF ECR-1 USING METHYLTRIETHANOLAMMONIUM CATIONS

BACKGROUND OF THE INVENTION

This invention relates to a novel process for making a crystalline zeolite designated herein as ECR-1.

The use of quaternary ammonium salts as templates or reaction modifiers in the preparation of synthetic crystalline zeolites, first discovered by R. M. Barrer in 1961, has led to preparation of zeolites with high silica to alumina ratios which are not found in nature. Reviews by Barrer ("Hydrothermal Chemistry of Zeolites," Academic Press, 1982) and Lok et al (Zeolites, vol. 3, p. 282, 1983) show the large number of zeolites that can be made in various organic template systems. A number of those zeolites may also be made without the templates. Although some zeolites are characterized as being made in the presence of but a single template, that same template may be used in the crystallization of a variety of zeolites. The type of zeolite which is produced is, in addition, a function of the reaction mixture composition, reaction and nucleation conditions and other variables that influence these metastable crystallization systems.

In particular, this method has been used to prepare ECR-1. ECR-1 is a large pore zeolite having a 12-ring channel structure (Leonowicz and Vaughan, Nature, 329, p. 819 (1987)) analogous to important commercial zeolite catalysts such as mordenite (dewaxing, hydroisomerization), Linde-L (EXAR) and Linde Omega. ECR-1 was previously synthesized using a tetraalkyl ammonium cation characterized as $(CH_3)_2 R_2N^+$, where R=ethyl, propyl, but hydroxypropyl; see, U.S. Pat. No. 4,657,748. The present invention is an improvement on that process.

SUMMARY OF THE PRESENT INVENTION

The present invention is a process for preparing a crystal-line zeolite. The steps of the process include preparing a reaction mixture including an oxide of sodium, an ammonium salt, water, a source of silica, a source of alumina and sodium aluminosilicate nucleating seeds. The reaction mixture has a composition, in terms of mole ratios of oxides, within the following ranges:

| | |
|---|---|
| $R_2O:Al_2O_3$ | 0.2 to 1.0 |
| $Na_2O:Al_2O_3$ | 1.0 to 7 |
| $SiO_2:Al_2O_3$ | 5 to 20 |
| $H_2O:Al_2O_3$ | 120 to 300 |
| $R_2O:Na_2O$ | 0.05 to 0.4 | where R is a $(CH_3)(C_2H_4OH)_3N^+$. The seeds are present in an amount to yield 1 to 15 mole percent of the total alumina content of the reaction mixture. The reaction mixture is blended sufficiently to form a substantially homogeneous mixture and then maintained at between about 20° C. and 200° C. under autogeneous pressure for a sufficient period of time to form crystals of a zeolite having a composition, in terms of mole ratios of oxides, in the range:

$$0.5 \text{ to } 0.02 R_2O : 0.90 \text{ to } 0.98 Na_2O : Al_2O_3 : 5 \text{ to } 12 SiO_2 : xH_2O$$

DESCRIPTION OF THE PREFERRED EMBODIMENT

ECR-1 synthesized using a template of methyltriethanolammonium, $(CH_3)(C_2H_4OH)_3N^+$, yields an improved material over prior templates from the viewpoints of higher crystal perfection (fewer intergrowths), lower levels of impurities and more reliable procedures. The template is lower in cost (by a factor of 6) and commercially available, rather than being a specialty custom made material (as are the previously used templates). As impurities in the template solutions (particularly $(CH_3)_4N^+$) promote the formation of impurity phases, such as mazzite, in ECR-1, the higher quality commercial alkyl-ammonium products are most desirable reaction components, yielding pure ECR-1.

ECR-1 is characterized by the x-ray diffraction pattern given in Table 1. The preferred synthesis gel has composition ratios in the range:

| Ratio | Range |
|---|---|
| $R_2O:Al_2O_3$ | 0.2 to 1.0 |
| $Na_2O:Al_2O_3$ | 1.0 to 7.0 |
| $SiO_2:Al_2O_3$ | 5 to 20 |
| $H_2O:Al_2O_3$ | 120 to 300 |
| $R_2O:Na_2O$ | 0.05 to 0.40 |

The product has a composition in the $SiO_2:Al_2O_3$ range of 5 to 12. Suitable methods of dealumination may further increase this ratio above 12 such as acid treatments, steam treatments, exchange with acidic halides in the vapor phase, solution exchange with ammonium silicon hexafuoride, ammonium bifluoride, or organic solvent exchange with Si $X_4$(X=F,Cl,Br,I).

EXAMPLE 1

Synthesis of methyltriethanolammonium ECR-1 was done from a gel stoichiometry of:

$$0.6((EtOH)_3MeN)_2O : 1.35Na_2O : Al_2O_3 : 7.5SiO_2 : 120H_2O : (1.71Na_2SO_4)$$

by first making a sodium aluminate solution by dissolving 8.0 g aluminum oxide trihydrate in a solution containing 6.24 g NaOH and 15 ml $H_2O$. After cooling down, the solution was diluted to 26 g with distilled $H_2O$. In a 200 ml blender were mixed 74.9 g of sodium silicate (P. Q. Corp., N brand, 28.7% $SiO_2$:8.9% $Na_2O$) and 6.4 g of a "seed" solution (13.33 $Na_2O$: $Al_2O_3$: 12.5 $SiO_2$: 267 $H_2O$, see U.S. Pat. Nos. 3,574,538 and 4,340,573). Blended into this silicate solution were 26.8 g of 40% aq. methyltriethanolammonium hydroxide (made by boiling down 42.9 g of 25% solution; Southwestern Analytical Chem. Inc.), 10.2 g sodium aluminate solution, and 18.2 g $Al_2(SO_4)_3 \cdot 17H_2O$ dissolved in 22.7 g H20. The total weight of the mixture was adjusted to 160 g by addition of $H_2O$, and then thoroughly homogenized. It was placed in a stainless steel autoclave and reacted at 150° C. for 4 days. The product was filtered, washed with distilled $H_2O$, and dried at 115° C. X-ray powder diffraction analysis showed the crystalline phase to be pure ECR-1. See Table 1. Elemental analysis by ICP-AES gave 7.55% Al; 28.3% Si: 6.54% Na which corresponds to a product composition of $$1.02 Na_2O : Al_2O_3 : 7.2 SiO_2$$

The sample of ECR-1 absorbed 4.7% n-hexane at 50 torr and 3.7% mesitylene at 0.8 torr after calcination at 600° C. Thermogravimetric analysis showed a water loss of 13.4%.

EXAMPLE 2

Synthesis of methyltrithanolammonium ECR-1 from a gel stoichiometry of:

$$0.8((EtOH)_3MeN)_2O: 1.8Na_2O: Al_2O_3: 10SiO_2: 150H_2O$$

was achieved by first making a sodium aluminate solution by dissolving 9.44 g of sodium aluminate (Fisher; 1.14 $Na_2O:Al_2O_3\cdot 4H_2O$) in a solution containing 1.14 g NaOH and 25 ml $H_2O$. In a 200 ml blender were mixed 57.6 g of 40% colloidal silica (duPont Ludox HS-40) and 6.42 g of a "seed" solution (13.33 $Na_2O$: $Al_2O_3$: 12.5 $SiO_2$: 267 $H_2O$, see U.S. Pat. Nos. 3,574,538 and 4,340,573). Swirled in 45.9 g of 25% aq. methyltriethanolammonium hydroxide (Southwestern Analytical Chem. Inc.), sodium aluminate solution, and 18.2 g $Al_2(SO_4)_3\cdot 17H_2O$ dissolved in 22.7 g $H_2O$. The total weight of the mixture was adjusted to 150 g by addition of $H_2O$, and then thoroughly homogenized. It was placed in a stainless steel autoclave and reacted at 150° C. for 4 days. The product was filtered, washed with distilled $H_2O$, and dried at 115° C. oven. X-ray powder diffraction analysis showed the crystalline phase to be ECR-1 and a minor mordenite impurity.

EXAMPLE 3

Synthesis of methyltrithanolammonium ECR-1 from a gel stoichiometry of:

$$0.6((EtOH)_3MeN)_2O:1.05Na_2O:.3\ K_2O: Al_2O_3:7.5SiO_2: 120H_2O:(1.71Na_2SO_4)$$

was achieved by first making a sodium aluminate solution by dissolving 2.62 g aluminum oxide trihydrate in a solution containing 1.05 g NaOH, 1.60 g $KOH\cdot 5H_2O$ and 5 ml $H_2O$. In a 250 ml plastic beaker were mixed 62.2 g of sodium silicate (p. W. Corp., N brand, 28.7% $SiO_2$:8.9% $Na_2O$) and 5.32 g of a "seed" solution (13.33 $Na_2O$: $Al_2O_3$: 12.5 $SiO_2$: 267 $H_2O$ see U.S. Pat. Nos. 3,574,538 and 4,340,573), followed by 22.3 g of 40% aq. methyltriethanolammonium hydroxide (made by boiling down 35.7 g of 25% solution; Southwestern Analytical Chem. Inc.), the above sodium aluminate solution, and 15.2 g $Al_2(SO_4)_3\cdot 17H_2O$ dissolved in 17.9 g $H_2O$. The total weight of the mixture was adjusted to 134 g by addition of $H_2O$, and then thoroughly homogenized. The gel was placed in a stainless steel autoclave and reacted at 150° C. for 4 days. The product was filtered, washed with distilled $H_2O$, and dried at 115° C. X-ray powder diffraction analysis gave a pattern similar to that listed in Table 1, indicating the crystalline phase to be pure ECR-1. This sample of ECR-1 absorbed 4.0% n-hexane at 45 torr. Thermogravimetric analysis showed a water loss of 14.5%.

TABLE 1

| h | k | l | 2-theta | d(A) | Relative Intensity |
|---|---|---|---------|------|--------------------|
| 1 | 1 | 0 | 5.92    | 14.9 | 14 |
| 1 | 2 | 0 | 8.31    | 10.6 | 21 |
| 2 | 0 | 0 | 9.72    | 9.10 | 100 |
| 1 | 3 | 0 | 11.24   | 7.87 | 45 |
| 1 | 0 | 1 | 13.07   | 6.77 | 94 |
| 1 | 1 | 1 | 13.41   | 6.60 | 5 |
| 3 | 1 | 0 | 14.99   | 5.91 | 22 |
| 2 | 1 | 1 | 15.85   | 5.59 | 8 |
| 2 | 4 | 0 | 16.63   | 5.33 | 5 |
| 3 | 3 | 0 | 17.77   | 4.987 | 10 |
| 1 | 4 | 1 | 18.72   | 4.736 | 8 |
| 3 | 4 | 0 | 19.98   | 4.440 | 16 |
| 1 | 6 | 0 | 21.03   | 4.221 | 30 |
| 3 | 4 | 1 | 23.39   | 3.800 | 52 |
| 1 | 6 | 1 | 24.18   | 3.678 | 24 |
| 1 | 0 | 2 | 24.83   | 3.583 | 7 |
| 5 | 2 | 0 | 25.44   | 3.498 | 98 |
| 4 | 5 | 0 | 26.02   | 3.422 | 15 |
| 0 | 8 | 0 | 27.43   | 3.249 | 53 |
| 2 | 3 | 2 | 28.12   | 3.171 | 87 |
| 2 | 8 | 0 | 29.09   | 3.067 | 4 |
| 2 | 4 | 2 | 29.64   | 3.011 | 22 |
| 5 | 4 | 1 | 30.66   | 2.913 | 76 |
| 2 | 9 | 0 | 32.24   | 2.774 | 3 |
| 1 | 9 | 1 | 33.44   | 2.677 | 11 |
| 1 | 7 | 2 | 34.63   | 2.588 | 12 |
| 5 | 3 | 2 | 36.24   | 2.477 | 13 |
| 1 | 2 | 3 | 37.78   | 2.379 | 7 |
| 1 | 9 | 2 | 39.82   | 2.262 | 12 |

What is claimed is:

1. A process for preparing an ECR-1 crystalline zeolite comprising:
   (a) preparing a reaction mixture comprising an oxide of sodium, an ammonium salt, water, a source of silica, a source of alumina and sodium aluminosilicate nucleating seeds, said reaction mixture having a composition, in terms of mole ratios of oxides, within the following ranges:

| | |
|---|---|
| $R_2O:Al_2O_3$ | 0.2 to 1.0 |
| $Na_2O:Al_2O_3$ | 1.0 to 7 |
| $SiO_2:Al_2O_3$ | 5 to 20 |
| $H_2O:Al_2O_3$ | 120 to 300 |
| $R_2O:Na_2O$ | 0.05 to 0.4 | where R is a $(CH_3)(C_2H_4OH)_3N^+$, and said seeds being present in an amount to yield 1 to 15 mole percent of the total alumina content of the reaction mixture;
   (b) blending the reaction mixture sufficiently to form a substantially homogeneous mixture;
   (c) maintaining the reaction mixture at between about 120° C. and 200° C. under autogeneous pressure for a sufficient period of time to form crystals of a zeolite having a composition, in terms of mole ratios of oxides, in the range:

$$0.5\ to\ 0.02R_2O:0.90\ to\ 0.98Na_2O:Al_2O_3:5\ to\ 12SiO_2:xH_2O$$

where R and x are defined above, and such that the x-ray powder diffraction pattern of said zeolite is essentially identical to that given in Table 1, and
   (d) recovering said zeolite crystals.

2. The process of claim 1 further comprising exchanging the R group with an exchangeable cation selected from Group 1 through Group VIII of the Periodic Table.

3. The process of claim 1 wherein the crystalline zeolite product has a composition in the range:

$$0.1\ to\ 0.02R_2O:0.95\ to\ 0.98Na_2O:Al_2O_3:6\ to\ 10SiO_2.$$

4. The process of claim 1 wherein the source of silica is sodium silicate and the sources of alumina are hydrated alumina and an aluminum salt selected from the group consisting of the chloride, sulfate and nitrate salts.

5. The process of claim 1 wherein the reaction mixture is maintained at between 140° C. and 180° C.

6. The process of claim 1 wherein the seeds are present in an amount to yield 1 to 10 mole percent of the total alumina content of the reaction mixture.

7. The process of claim 1 wherein said seeds comprise the crystalline zeolite product.

* * * * *